United States Patent Office 3,364,758
Patented Jan. 23, 1968

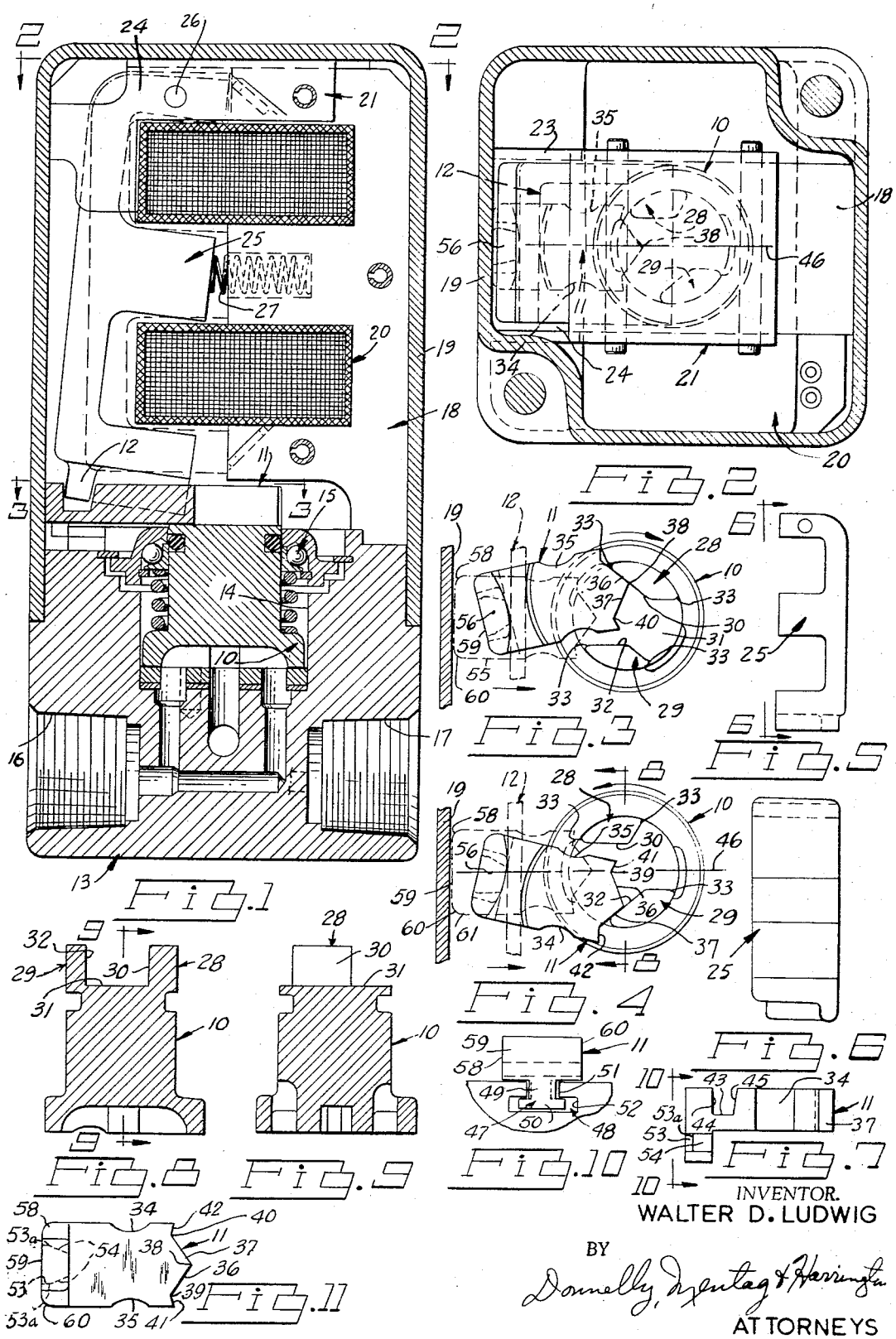

3,364,758
MEANS FOR CONVERTING LINEAR MOTION
TO RECIPROCATING MOTION
Walter D. Ludwig, Bloomfield Township, Oakland County,
Mich., assignor to Mac Valves, Inc., Oak Park, Mich.,
a corporation of Michigan
Filed Sept. 23, 1964, Ser. No. 398,709
1 Claim. (Cl. 74—99)

This invention relates generally to apparatus adapted to provide particular mechanical movements, and more particularly to a mechanical movement means for converting reciprocating linear motion into oscillating rotary motion. Many problems are encountered in automation machinery used in present day industry which require the converting of a first type of motion into a second type of motion. Requirements of this type are encountered in work transfer apparatus and the like, as well as in pressure fluid control valves for controlling the flow of pressure fluid in control circuits and power circuits. Accordingly, it is an object of the present invention to provide a novel and improved mechanical movement means for converting reciprocating linear motion into oscillating rotary motion, and more particularly an interrupted rotary motion.

It is another object of the present invention to provide a novel and improved means for converting reciprocating linear motion into oscillating rotary motion without the use of return springs or the like.

It is still another object of the present invention to provide a novel and improved means for converting reciprocating linear motion into oscillating rotary motion which incorporates a rotor having a pair of extended lugs with converging surfaces on one end thereof, and an actuator provided with a pair of converging surfaces adapted to form pockets to coact alternately with the two lugs on the rotor as the actuator is moved forwardly and backwardly by a pusher means which moves in a straight line offset from the lugs.

It is still another object of the present invention to provide a novel and improved means for converting reciprocating linear motion into oscillating rotary motion which may be incorporated in an apparatus capable of providing an in-line motion, and wherein it is desired to convert such in-line motion into a rotary motion, for example, in a reversing rotary valve provided with a solenoid having an armature or pusher means movable to provide straight line motion.

It is still another object of the present invention to provide a novel and improved means for converting reciprocating linear motion into oscillating rotary motion which means comprises a small number of parts, is economical of manufacture, and is efficient and trouble-free in operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is an elevational view, partly in section, of a reversing rotary valve for use in controlling pressure fluid and which is provided with means for converting a reciprocating linear motion into oscillating rotary motion in accordance with the principles of the present invention;

FIG. 2 is a horizontal sectional view of the structure illustrated in FIG. 1, taken along the line 2—2 thereof and looking in the direction of the arrows;

FIG. 3 is a fragmentary top plan view of the motion converting means illustrated in FIG. 1, taken along the line 3—3 thereof and looking in the direction of the arrows;

FIG. 4 is a view similar to FIG. 3 and showing the motion converting means moved to a different position;

FIG. 5 is a side elevational view of a swingable armature employed in the valve structure of FIG. 1 for pushing the actuator member in the motion converting means;

FIG. 6 is a front elevational view of the armature structure illustrated in FIG. 5, taken in the direction of the line marked 6—6 and looking in the direction of the arrows;

FIG. 7 is a side elevational view of the actuator employed in the motion converting means of the present invention;

FIG. 8 is an elevational sectional view of the rotor structure illustrated in FIG. 4, taken along the line 8—8 thereof and looking in the direction of the arrows;

FIG. 9 is an elevational sectional view of the structure illustrated in FIG. 8, taken along the line 9—9 thereof and looking in the direction of the arrows;

FIG. 10 is an end elevational view of the actuator illustrated in FIG. 7, taken along the line 10—10 thereof, looking in the direction of the arrows and showing the actuator mounted in the guide track; and, FIG. 11 is a bottom plan view of the actuator structure illustrated in FIG. 7.

Referring now to the drawing and in particular to FIGS. 1, 2, 3 and 4, the numeral 10 generally indicates a rotor or rotatable member which is shown for illustration purposes as the rotary valve element in a pressure fluid reversing rotary control valve. The numeral 11 generally indicates a slidably mounted actuator which is adapted to move toward and away from the rotor 10 to impart an oscillating rotary motion to the rotor 10. The actuator 11 is adapted to be moved backwardly and forwardly by a suitable pusher means as the armature projection 12 shown in the illustrative embodiment. It will be understood that the pusher means 12 may be a manually operated device as well as a power driven device.

The reversing rotary valve shown in FIGS. 1 and 2 is merely used for illustrative purposes and does not form any part of this invention and, accordingly, it has not been completely shown in detail. The details of the valve shown in FIGS. 1 and 2 are shown in my copending patent application filed on the same day that this application was filed and entitled, "Swingable Armature Solenoid Operated Rotary Valve." The illustrative valve will, however, be described generally so that the mechanical movement means of the present invention may be clearly understood. The illustrative valve comprises generally a valve body 13 in which is formed the cylinder compartment 14 in which is rotatably mounted the rotor 10. The rotor 10 is operatively mounted in the compartment 14 by any suitable means, as by means of the ball bearing and spring combination retainer means generally indicated by the numeral 15. In the illustrative valve the rotor 10 functions as a valve member for directing the flow of pressure fluid from a suitable source of the same to a pressure fluid operated device to power the same or for controlling a power device. The pressure fluid enters the valve body through a suitable port as 16 and thence passes through suitable fluid passageways upwardly into additional passageways in the bottom end of the rotor 10. When the rotor 10 is in the initial or first position shown in FIGS. 2 and 4, the pressure fluid will be directed through the valve body so as to discharge pressure fluid through one port and receive pressure from a control device and direct it out through a discharge port. When the mechanical movement means of the present invention is actuated to rotate the rotor 10 to a second shifted position as shown in FIG. 3, the flow of pressure fluid through the valve is reversed.

In the illustrative valve the numeral 18 generally represents a solenoid core which is secured in the solenoid housing 19. The numeral 20 generally designates a solenoid coil which is retained in the housing 19 by means of the core 18, the mounting channel bracket 21 and the bracket 22. The channel bracket 21 is provided with a pair of spaced apart arms 23 and 24 between which is swingably mounted the upper end of an E-shaped swingable armature generally indicated by the numeral 25. The armature 25 is swingably mounted between the legs 23 and 24 by means of the pin 26. The swingable armature 25 is adapted to be normally biased backwardly to the position shown in FIG. 1 by means of the return spring 27 which has one end thereof abutting the middle leg of the E-shaped armature, and the other end thereof seated in a suitable recess in the solenoid core 18.

As shown in FIG. 1, the armature 25 is provided with the pusher bar 12 on the lower side thereof, and it is adapted to be moved inwardly and outwardly with the swinging armature 25. The mechanical movement means comprising amongst other elements the elements 10, 11 and 12, is capable of coacting with the swingable solenoid armature 25 to provide a momentary actuation of the valve member formed on the rotor 10 with the illustrated single solenoid. Heretofore, such momentary actuation has been carried out with a double solenoid valve wherein one of the solenoids is momentarily energized to shift the valve element from an initial or first position to a second position, and then the solenoid is de-energized to let the valve rest in the second position. The second solenoid is then used to shift the valve element back to the initial or first position.

As best seen in FIGS. 2, 3 and 4, the rotor 10 is provided with a pair of upwardly extended lugs 28 and 29 for coaction with the actuator 11 to provide the rotor 10 with oscillating rotary motion. The lug 28 is provided with an elongated surface 30 which is disposed on a plane vertical or perpendicular to the upper end 31 of the rotor 10. The surface 30 is disposed at an acute angle relative to a second surface 32 formed on the inner face of the lug 29. The surface 30 is also disposed perpendicular to the rotor top end surface 31. The planes of the surfaces 30 and 32 are disposed so as to be alternately parallel to the straight line motion of the actuator. The surfaces 30 and 32 of the lugs terminate in a rounded edge at each end thereof, as indicated by the numerals 33.

As shown in FIGS. 2, 3 and 4, the rotor 10 is adapted to be oscillated through a rotary path by means of the actuator 11 which is adapted to be moved inwardly and outwardly relative to the rotor 10 by means of the armature projection or pusher means 12. When the armature 18 is energized, the pusher means 12 will move the actuator 11 to the right as viewed in FIG. 3, and the hereinafter described pocket on the actuator into shifting engagement with the rounded corner 33 of the lug 28 on the top end of the rotor 10. It will be understood that the actuator 11 moves inwardly and outwardly on a horizontal plane perpendicular to the rotary axis of the rotor 10. The actuator 11 coacts with the lugs 28 and 29 to convert the straight line or linear motion of the pusher means 12 into an oscillating rotary motion.

The actuator 11 is substantially rectangular in vertical cross section and it is provided with a pair of oppositely disposed, vertically extended concave recesses 34 and 35 on opposite sides thereof for clearance purposes to clear the lugs 28 and 29 during actuator movements. The actuator 11 has an overall block shaped configuration, and is provided on the front end thereof with the vertically disposed converging angular surfaces 36 and 37 which terminate in the apex 38. The apex 38 is formed at the outer ends of the two angular surfaces 36 and 37. The rear ends of the angular surfaces 36 and 37 terminate at the juncture points 39 and 40 between these surfaces and a pair of adjacently disposed diverging surfaces 41 and 42 to form a pair of pockets. The surfaces 36 and 37 and the adjacent secondary surfaces 30 and 32 are vertically disposed relative to the rotational axis or longitudinal axis of the actuator 11, and these surfaces are also perpendicular to the straight line direction of actuation of the actuator 11 and pusher 12 when in alternate positions during an operation thereof.

As best seen in FIGS. 4 and 7, the actuator 11 is provided with the transfer slot 43 at the rear end thereof. The bottom surface of the slot 43 is horizontal and the rear wall 44 of the slot is disposed perpendicular to the bottom surface. However, as shown in FIGS. 2, 3 and 4, the surface of the rear wall 44 is convexly shaped when viewed from the slot 43 and looking towards the rear of the actuator 11. The slot front wall 45 is sloped upwardly and forwardly relative to the bottom surface of the slot 43, and it is also formed with a convex curvature from one side of the actuator to the other side of the actuator when the same is viewed from the slot 43 and looking toward the front end of the actuator 11.

As shown in FIGS. 1, 2, 3 and 4, the armature projection 12 is adapted to be received in the actuator slot 43 with a clearance so as to permit the actuator 11 to oscillate between the positions shown in FIGS. 2, 3 and 4 during a valve rotor actuation. The armature projection 12 is adapted to move inwardly and outwardly as shown in FIGS. 2, 3 and 4 and to remain at all times in a position perpendicular to the direction of straight line movement along the line of actuation 46.

As shown in FIGS. 10 and 11, the actuator 11 is provided with an integral inverted T-shaped guide member on the lower side thereof for coaction with the mating inverted T-shaped guide track generally indicated by the numerals 47 and 48, respectively. The T-shaped guide member 47 is provided with the leg portion 49 on the lower end thereof on which is formed the integral cross head portion 50. The T-shaped guide portions 49 and 50 are adapted to be slidably received in the T-shaped guide track. The guide leg portion 49 is provided with a flat side 53 on each side thereof, and this flat side or portion extends from the rear edge of the actuator 11 forwardly for approximately 1/16" to the point 53a, as viewed in FIG. 11. The point 53a represents the vertical junction line between one side flat surface and an adjacent vertical surface which slopes forwardly and inwardly towards the front end of the actuator 11. These sloping surfaces are indicated by the numerals 54. As shown in FIGS. 2, 3 and 4, the sloping surfaces 54 converge as viewed from the rear end of the actuator 11.

In operation, with the rotor 10 in the initial or first operative position shown in FIGS. 2 and 4, the actuator 11 would be in the dotted line position shown in FIG. 2. When the solenoid 18 is energized, the armature projection 12 or pusher means is moved inwardly, or to the right as viewed in FIG. 1, and it will push the actuator 11 to the position shown in FIG. 3. As the actuator 11 moves inwardly or away from the solenoid housing, the adjacent rounded corner 33 on the lug 28 will engage the V-shaped pocket formed on the front end of the actuator 11 by the surfaces 36 and 41 and juncture 39. The actuator 11 will pivot or rock counter-clockwise, as viewed in FIG. 3, and will continue moving inwardly or to the right as viewed in FIG. 3, until the position shown in dotted lines in FIG. 3 is reached. It will be seen that as the actuator 11 is moved to the right, as viewed in FIG. 3, it will pivot or rock about the point 56 which is an imaginary point on the rear end of the actuator 11 and which also moves inwardly along the straight line of pusher means actuation 46. The actuator 11 will be moved inwardly toward the rotor 10 to rotate the valve element or rotor 10 clockwise so as to bring the lug surface 30 parallel to the line of actuation 46. The pusher means 12 is then stopped by the closing of the solenoid 18 at which time the solenoid is deenergized and the actuator 11 will be moved backwardly to the left by the spring means 27 as viewed in FIG. 3, and to the squared up dotted line position shown in FIG. 3 and indicated by the numeral 55. The left rear corner 58 of the rear flat wall 59 first contacts the cover wall 19 during a backward movement of the actuator and then the actuator pivots clockwise into the dotted position 55.

It will be seen that the actuator position 55 is the same as the dotted line position for the actuator 11 shown in FIG. 2, before the shifting operation was started. The rotor 10 will remain in the position shown in FIG. 3 to which it has been shifted, until the pusher means 12 is again operated and the actuator 11 moved inwardly to rotate the rotor 10 counter-clockwise back to the initial or first position shown in FIGS. 2 and 4. As the actuator moves inwardly, the adjacent rounded corner 33 on the lug 29 will engage the pocket formed on the front end of the actuator 11 by the surfaces 37 and 42 and juncture 40. The actuator rocks about the imaginary point 56 and moves to the solid line position of FIG. 4. The solenoid is then de-energized and the actuator 11 is moved backwardly toward the solenoid cover wall until the right corner 60 abuts this wall and pivots the actuator counter-clockwise to the dotted line position 61. The distance the actuator moves along the line of actuation 46 is controlled by the stroke of the armature 25.

It will be seen that the illustrated motion converting means may be adapted to provide an interrupted oscillating rotary motion by reason of the particular motion of the actuator 11. The actuator 11 first moves inwardly to rotate the rotor 10 from an initial or first position to a second position. The actuator 11 is then moved rearwardly to its starting position. After a predetermined time interval the actuator 11 is again moved inwardly, as shown in FIG. 4, and it returns the rotor element 10 to its starting position. It will be understood that the structure shown in FIGS. 3 and 4 may be utilized in a series arrangement incorporating a plurality of such means so as to provide any sequence of conversions of straight line motions into interrupted rotary motions. It may also be employed to provide uninterrupted oscillating rotary motion by providing the rotor 10 with a return spring, whereby each time the actuator 11 is moved inwardly, it will always contact the lug 28. In the illustrative embodiment, the rotary element 10 is oscillated through approximately 30° arcuate travel and the actuator 11 rotates about an imaginary point 56 for a displacement of 10° on either side of the actuator centerline 46.

Although the actuator 11 has been illustrated and described as being operated by the projection 12 on the swingable armature 25, it will be understood that the actuator 11 may be moved inwardly and outwardly along its operative path by any suitable pusher means. For example, the actuator 11 may be provided with a spring biased manual or air powered operator similar to the type employed in the prior art valves whereby the actuator 11 may be manually moved inwardly and then be spring returned by a suitable spring having one end connected to the valve body or supporting means for the actuator, and the other end connected to the actuator 11.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

I claim:

1. A mechanical movement means for converting reciprocating linear motion into oscillating rotary motion, comprising:
   (a) a rotor;
   (b) means for rotatably supporting said rotor;
   (c) an actuator rockably mounted for lateral rocking movement and being slidably mounted along a straight line perpendicular to the axis of rotation of said rotor;
   (d) a pusher means movable along said straight line and engageable with said actuator for moving the actuator into engagement with said rotatably mounted member for providing said rotatably mounted member with oscillating rotary motion to rotate it between a first position and a second position;
   (e) said rotor being provided with a pair of laterally spaced apart axially extended members disposed on opposite sides of said straight line;
   (f) said actuator is provided with a pair of laterally spaced apart pockets disposed on opposite sides of said actuator and on opposite sides of said straight line and adapted for alternate engagement with said axially extended members when the actuator is activated by said pusher means;
   (g) said axially extended members each having a surface on the inner side thereof which is disposed at an acute angle relative to each other, and the planes of these surfaces are disposed so as to be alternately parallel to the straight line motion of the actuator when the rotatably mounted member is rotated between said first and second positions; and,
   (h) said pockets on the actuator are formed by the front end configuration of the actuator which is provided with a pair of converging angular surfaces which terminate at one end in an apex, and a diverging surface formed at the other end of each of said converging surfaces.

References Cited

UNITED STATES PATENTS

| | | | |
|---|---|---|---|
| 1,479,577 | 1/1924 | Anderson | 200—68 |
| 1,480,138 | 1/1924 | Anderson | 200—68 |
| 2,154,796 | 4/1939 | Whittington | 200—17 |
| 2,247,061 | 6/1941 | Lodge | 200—153 |
| 2,902,559 | 9/1959 | Morris | 200—153 |

FOREIGN PATENTS 534,735  10/1931  Germany.

FRED C. MATTERN, Jr., *Primary Examiner.*

F. E. BAKER, W. S. RATLIFF, *Assistant Examiners.*